United States Patent
Salter et al.

(10) Patent No.: US 9,459,453 B2
(45) Date of Patent: Oct. 4, 2016

(54) WINDSHIELD DISPLAY SYSTEM

(71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 14/596,800

(22) Filed: Jan. 14, 2015

(65) Prior Publication Data

US 2015/0138816 A1   May 21, 2015

Related U.S. Application Data

(63) Continuation-in-part of application No. 14/086,442, filed on Nov. 21, 2013.

(51) Int. Cl.
| | |
|---|---|
| *B60Q 1/26* | (2006.01) |
| *B60R 1/12* | (2006.01) |
| *G02B 27/01* | (2006.01) |
| *B60Q 3/04* | (2006.01) |
| *B60K 35/00* | (2006.01) |

(52) U.S. Cl.
CPC ........... *G02B 27/0101* (2013.01); *B60K 35/00* (2013.01); *B60Q 3/042* (2013.01); *G02B 27/01* (2013.01); *B60K 2350/2052* (2013.01); *B60K 2350/922* (2013.01); *B60K 2350/927* (2013.01)

(58) Field of Classification Search
CPC ............ B60K 35/00; B60K 2350/203; B60K 2350/2052; B60Q 1/302; B60Q 3/0213; B60Q 3/042; G02B 27/01; G02B 27/0101
USPC ......................................... 362/494, 503, 510
See application file for complete search history.

(56) References Cited

U.S. PATENT DOCUMENTS

| | | | |
|---|---|---|---|
| 5,709,453 | A | 1/1998 | Krent et al. |
| 6,729,738 | B2 | 5/2004 | Fuwausa et al. |
| 6,773,129 | B2 | 8/2004 | Anderson, Jr. et al. |
| 6,851,840 | B2 | 2/2005 | Ramamurthy et al. |
| 6,871,986 | B2 | 3/2005 | Yamanaka et al. |
| 6,986,581 | B2 | 1/2006 | Sun et al. |
| 6,990,922 | B2 | 1/2006 | Ichikawa et al. |
| 7,213,923 | B2 | 5/2007 | Liu et al. |
| 7,264,366 | B2 | 9/2007 | Hulse |
| 7,264,367 | B2 | 9/2007 | Hulse |
| 7,441,914 | B2 | 10/2008 | Palmer et al. |
| 7,745,818 | B2 | 6/2010 | Sofue et al. |
| 7,753,541 | B2 | 7/2010 | Chen et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Vichit Chea; Price Heneveld LLP

(57) ABSTRACT

A windshield display system for a vehicle is provided herein and includes a rearview mirror assembly having at least one light source configured to illuminate a location on a windshield. At least one photoluminescent structure is disposed at the location and is configured to luminesce in response to excitation by light emitted from the at least one light source.

19 Claims, 4 Drawing Sheets

(56) References Cited

U.S. PATENT DOCUMENTS

| | | |
|---|---|---|
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2012/0001406 A1 | 1/2012 | Paxton et al. |
| 2012/0280528 A1 | 11/2012 | Dellock et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

WINDSHIELD DISPLAY SYSTEM

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a windshield display system for a vehicle is provided. A rearview mirror assembly having at least one light source is configured to illuminate a location on a windshield. At least one photoluminescent structure is disposed at the location and is configured to luminesce in response to excitation by light emitted from the at least one light source.

According to another aspect of the present invention, a windshield display system for a vehicle is provided. At least one light source is disposed proximate an upper portion of the windshield and is configured to illuminate a location on a windshield. At least one photoluminescent structure is disposed at the location and is configured to luminesce in response to excitation by light emitted from the at least one light source.

According to another aspect of the present invention, a windshield display system for a vehicle is provided. A first light source is configured to emit light in a fixed direction toward a windshield. A second light source is configured to emit light in an adjustable direction toward the windshield. At least one photoluminescent structure is coupled to the windshield and is configured to luminesce in response to excitation by light emitted from at least one of the first light source and the second light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a windshield display system for a vehicle. The windshield display system advantageously employs one or more photoluminescent structures configured to convert light received from an associated light source and re-emit the light at a different wavelength typically found in the visible spectrum.

Figure 1A:
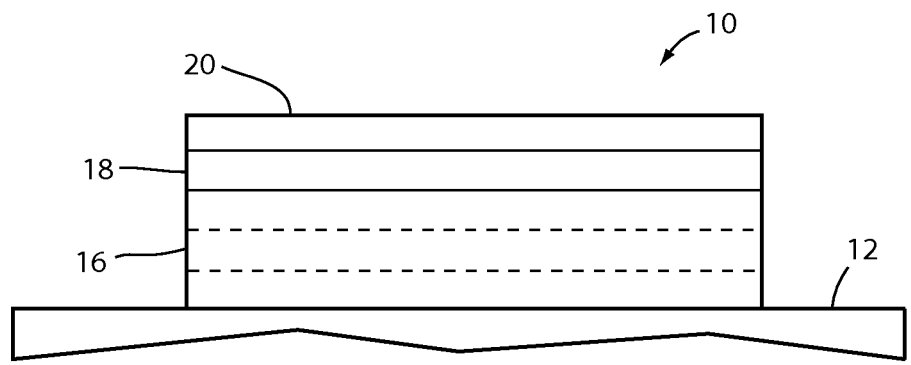
FIG. 1A illustrates a photoluminescent structure coupled to a substrate, according to one embodiment.
Figure 1B:
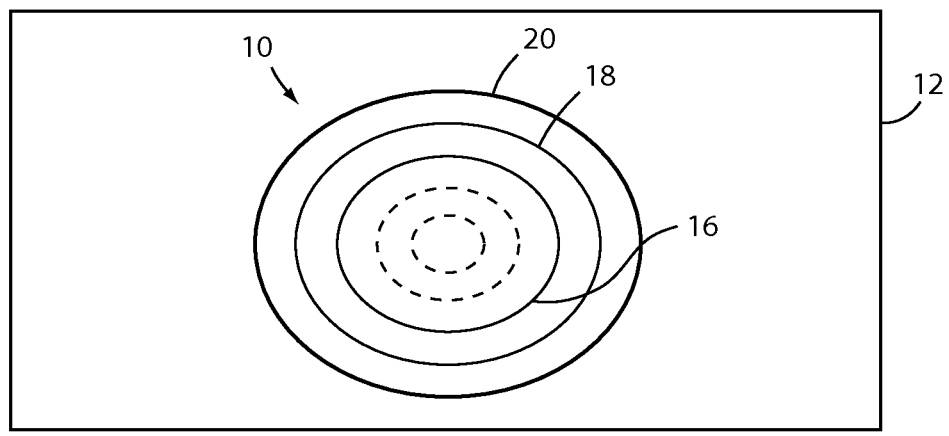
FIG. 1B illustrates a photoluminescent structure coupled to a substrate, according to another embodiment.
Figure 1C:
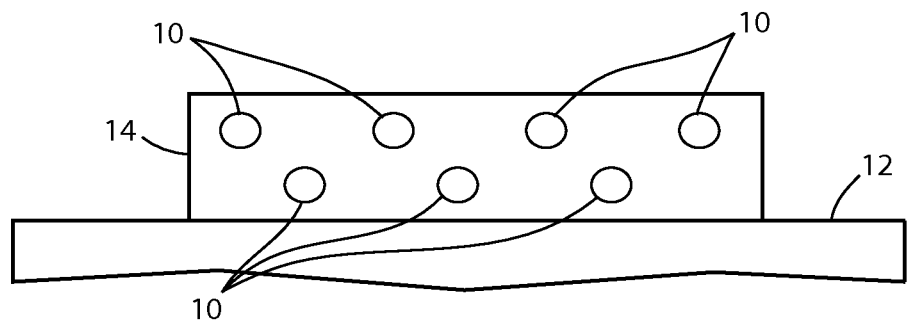
FIG. 1C illustrates a photoluminescent structure coupled to a substrate, according to yet another embodiment.

Referring to FIGS. 1A-1C, various exemplary embodiments of a photoluminescent structure 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelength of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
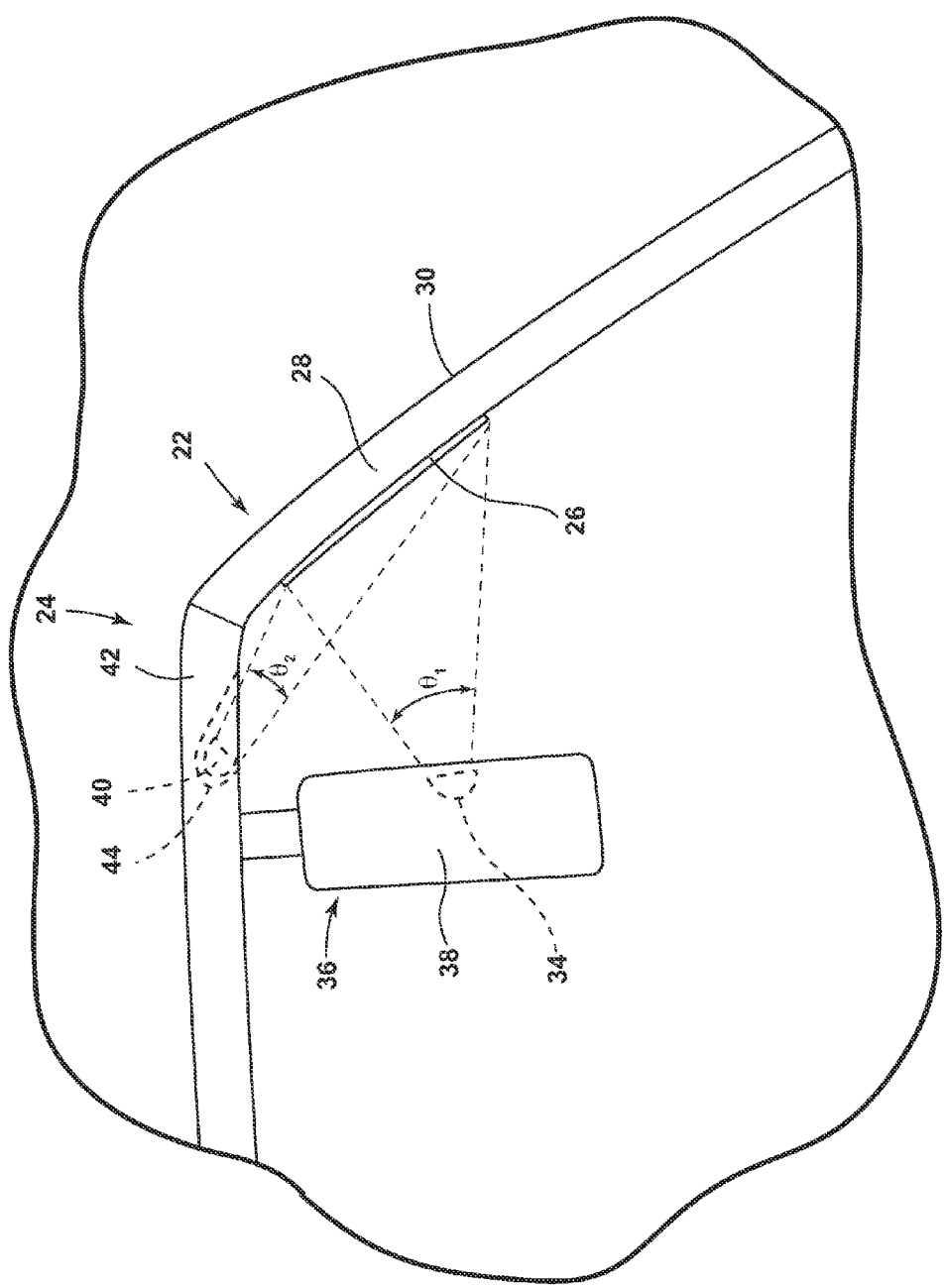
FIG. 2 is a cut away view of a vehicle employing a windshield display system according to one embodiment.

Referring to FIG. 2, one embodiment of a windshield display system 22 is generally shown for use in a vehicle 24. The system 22 includes at least one photoluminescent structure 26 disposed at a location 28 on a front windshield 30. The location 28 may be on an upper portion of the windshield 30 that is visible to occupants inside the vehicle 24. Photoluminescent structure 26 may be applied to the windshield 30 or otherwise integrated therein. In operation, photoluminescent structure 26 is configured to luminesce in response to excitation by light emitted from at least one light source 34. According to one embodiment, the light source 34 may be part of a rearview mirror assembly 36 that is disposed proximate the upper portion of the windshield 30. The light source 34 may be disposed to illuminate the location 28 from a housing portion 38 of the rearview mirror assembly 36 that faces the windshield 30. Light emitted from the light source 34 may be diffuse and have a uniform intensity to provide an even distribution of light to the location 28.

The location 28 of photoluminescent structure 26 may be selected to be in relative proximity light source 34, thereby minimizing the distance in which light emitted from light source 34 needs to travel before reaching photoluminescent structure 26. This helps ensure that at least a portion of the light emitted from light source 34 will still be directed toward the location 28 to excite photoluminescent structure 26 despite minor positional adjustments (e.g., translational and/or rotational) made to the rearview mirror assembly 36. Additionally, light source 34 may be configured to emit light at a beam angle $\theta_1$ selected to ensure that the location 28 is sufficiently illuminated so long as the rearview mirror assembly 36 is within a range of positions. The range of positions may be selected to include common positions of the rearview mirror assembly 36 that are associated with vehicle operators of varying height.

At least one light source 40 may be coupled to a roof structure such as a headliner 42 of the vehicle 24. Light source 40 may be disposed in a recessed portion 44 of the headliner 42 that is configured such that light source 40 is hidden from the view of vehicle occupants. Light source 40 may be positioned to illuminate location 28 or a different location of the windshield 30 to excite another photoluminescent structure. It should be appreciated that light sources 34 and 40 may each illuminate the same location (e.g., location 28) or a distinct location. Light source 40 is typically stationary, and as such, light can be emitted therefrom in a fixed direction and at a smaller beam angle $\theta_2$ relative to that of light source 34. When selecting a light source for exciting a given photoluminescent structure, it may be advantageous to use light sources that emit light in a fixed direction, such as light source 40, to illuminate locations of the windshield 30 that are farther away from the rearview mirror assembly 36 as these locations may be difficult to illuminate using light sources, such as light source 34, that may be prone to occasional positional adjustments.

Figure 3:
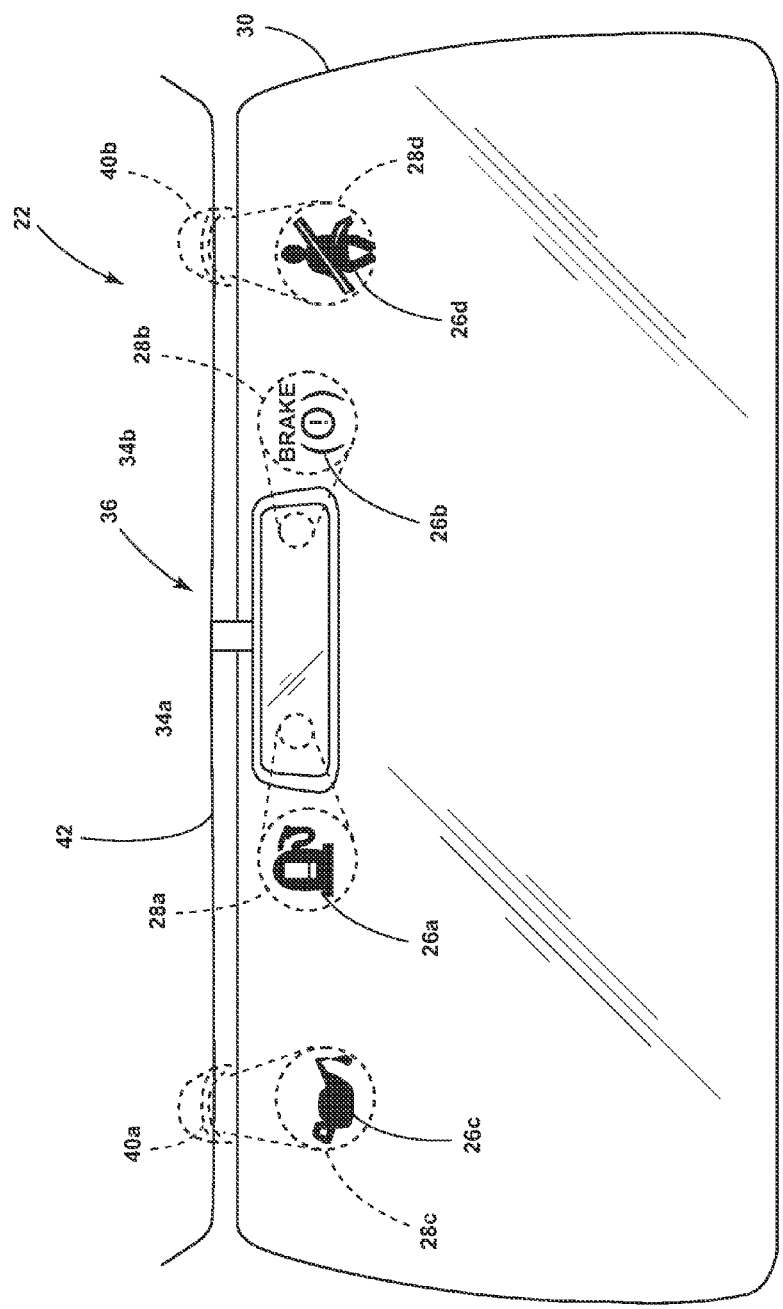
FIG. 3 is a perspective view of the windshield shown in FIG. 2 according to one embodiment.

Referring to FIG. 3, the windshield 30 is shown from the vantage point of a vehicle occupant to better illustrate an exemplary embodiment of the windshield display system 22. A plurality of light sources, shown as light sources 34a and 34b are coupled to the rearview mirror assembly 36 and are each configured to illuminate a uniquely associated location 28a, 28b of the windshield 30. Additionally, a plurality of light sources 40a and 40b are coupled to the headliner 42. Light sources 40a and 40b may be spaced laterally across the headliner 42 and are each configured to illuminate a uniquely associated location 28c, 28d of the windshield 30. Although locations 28a-28d correspond to distinct locations in the presently illustrated embodiment, it is to be understood that a given location may coincide or at least partially overlap with another location in other embodiments.

Referring still to FIG. 3, a photoluminescent structure 26a-26d is disposed at each location 28a-28d and is configured to luminesce in response to excitation from the corresponding light source 34a, 34b, 40a, 40b. As shown, photoluminescent structures 26a-26d are each arranged to convey information when in a state of luminescence. For purposes of illustration, photoluminescent structure 26a is arranged as a low fuel indicator, photoluminescent structure 26b is arranged as a break warning indicator, photoluminescent structure 26c is arranged as a low oil indicator, and photoluminescent structure 26d is arranged as a seatbelt indicator. It should be understood, however, that a given photoluminescent structure is not limited to any particular arrangement and may be arranged in any identifying form including a symbol, text, icon, pictogram, the like, or a combination thereof.

According to one embodiment, each light source 34a, 34b, 40a, 40b is independently operable at varying intensities and may be powered by the vehicle power supply or other power supply. Each light source 34a, 34b, 40a, 40b may be configured to emit blue light (~450-495 nanometers in wavelength) and may be embodied as a blue light emitting diode (LED). The use of blue LEDs to excite photoluminescent structures 26a-26d may be advantageous since blue LEDs are generally cost effective and the human eye is less sensitive to blue light. Thus, should any blue light be reflected off the windshield 30 and/or photoluminescent structure 26a-26d, vehicle occupants are less likely to notice the blue light or be adversely affected thereby. In alternative embodiments, other LED types such as ultraviolet (UV) or violet LEDs may be used instead of blue LEDs.

When a given one of photoluminescent structures 26a-26d is excited by light emitted from the corresponding light source 34a, 34b, 40a, 40b, respectively, the given photoluminescent structure 26a-26d may luminesce in one or more colors, depending on how it's formulated. For example, the text portion "BRAKE" of photoluminescent structure 26b may be configured to luminesce in a first color when excited by light emitted from light source 34b, whereas the lower icon portion may be configured to luminesce in a second color in response to the same excitation. Alternatively, both the text and icon portions of photoluminescent structure 26b may be configured to luminesce in the same color when excited by light emitted from light source 34b.

Figure 4:
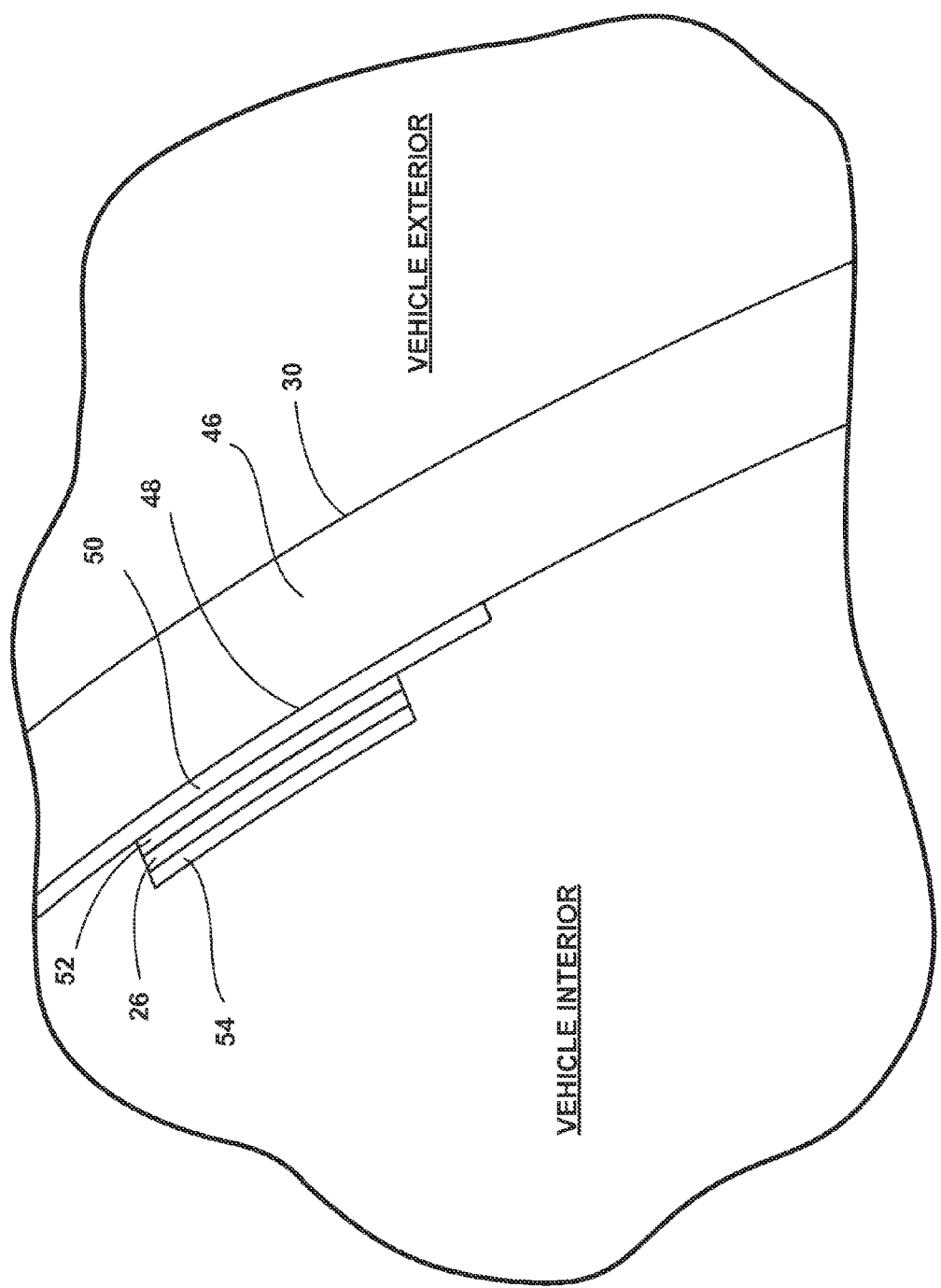
FIG. 4 illustrates an arrangement between a photoluminescent structure and a windshield according to one embodiment.

Referring to FIG. 4, one embodiment of the arrangement between a photoluminescent structure 26 and a windshield 30 is shown. The photoluminescent structure 26 is disposed at location 46 of the windshield 30, and more specifically, is coupled to a side 48 of the windshield 30 that faces the vehicle interior. A light blocking layer 50 is positioned between the photoluminescent structure 26 and side 48 of the windshield 30. The light blocking layer 50 may be embodied as a film configured to absorb UV radiation. In this way, sunlight propagating toward location 46 from the vehicle exterior is absorbed, thereby increasing the visibility of the photoluminescent structure 26 during the day. Additionally, the light blocking layer 50 may be configured to absorb whatever wavelength of light is selected to excite the photoluminescent structure 26. For example, if blue light is selected as the excitation light, then the light blocking layer 50 may be configured to absorb blue light as doing so helps prevent unwanted excitation of the photoluminescent structure 26 from blue light sources located in the vehicle exterior. In alternative embodiments, the light blocking layer 50 can include a black band or a black dot pattern similar to those commonly found in vehicles for shielding against UV radiation.

A light reflective layer 52 may be positioned between the light blocking layer 50 and the photoluminescent structure 26 and is configured to redirect or reflect light emitted from the photoluminescent structure 26 while in a state of luminescence. The light reflective layer 52 can be a white paint or other reflective coating and is particularly useful when the photoluminescent structure 26 exhibits Lambertian emittance. In such instances, light emitted from the photoluminescent structure 26 while in a state of luminescence has the propensity to travel in a multitude of directions therefrom. Thus, by providing the light reflective layer 52, light emitted from the photoluminescent structure 26 toward the vehicle exterior is redirected or reflected back toward the vehicle interior, thereby increasing the perceived brightness of the photoluminescent structure 26. A dark dead layer 54 may be coupled to the photoluminescent structure 26 and is configured to hide the photoluminescent structure 26 unless the photoluminescent structure 26 is in a state of luminescence, in which case the photoluminescent structure 26 is visible through the dark dead layer 54.

Accordingly a windshield display system has been advantageously provided herein. The system can include one or more photoluminescent structures, each configured to luminesce in response to excitation by light emitted from a light source. When in a state of luminescence, each photoluminescent structure conveys information to vehicle occupants. The information may be used to replace or supplement notifications provided to vehicle occupants by existing vehicle systems.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A windshield display system for a vehicle, comprising:
   a rearview mirror assembly having at least one light source configured to illuminate a location on a windshield;
   at least one photoluminescent structure disposed at the location and configured to luminesce in response to excitation by light emitted from the at least one light source.

2. The windshield display system of claim 1, further comprising a light blocking layer disposed at the location and configured to block ultraviolet radiation from entering the vehicle via the location on the windshield.

3. The windshield display system of claim 1, further comprising a light reflective layer disposed at the location and configured to reflect light incident thereon that is emitted from the at least one photoluminescent structure and is propagating toward the windshield.

4. The windshield display system of claim 1, further comprising a dark dead layer that hides the at least one photoluminescent structure unless the at least one photoluminescent structure is in a state of luminescence.

5. The windshield display system of claim 1, wherein the at least one photoluminescent structure conveys information when in a state of luminescence.

6. The windshield display system of claim 1, further comprising at least one light source coupled to a roof structure of the vehicle and configured to illuminate the location of the windshield illuminated by the at least one light source of the rearview mirror assembly or a separate location of the windshield.

7. The windshield display system of claim 1, wherein the at least one light source comprises one of an ultraviolet light source, a violet light source, and a blue light source.

8. A windshield display system for a vehicle, comprising:
   at least one light source of a rearview mirror assembly disposed proximate an upper portion of the windshield and configured to illuminate a location on a windshield; and
   at least one photoluminescent structure disposed at the location and configured to luminesce in response to excitation by light emitted from the at least one light source.

9. The windshield display system of claim 8, further comprising a light blocking layer disposed at the location and configured to block ultraviolet light from entering the vehicle via the location on the windshield.

10. The windshield display system of claim 8, further comprising a light reflective layer disposed at the location and configured to reflect light incident thereon that is emitted from the at least one photoluminescent structure and is propagating toward the windshield.

11. The windshield display system of claim 8, further comprising a dark dead layer that hides the at least one photoluminescent structure unless the at least one photoluminescent structure is in a state of luminescence.

12. The windshield display system of claim 8, wherein the at least one photoluminescent structure conveys information when in a state of luminescence.

13. The windshield display system of claim 8, wherein the at least one light source comprises one of an ultraviolet light source, a violet light source, and a blue light source.

14. The windshield display system of claim 8, wherein the at least one light source is part of a rearview mirror assembly of the vehicle.

15. A windshield display system for a vehicle, comprising:
   a first light source configured to emit light in a fixed direction toward a windshield;
   a second light source configured to emit light in an adjustable direction toward the windshield; and
   at least one photoluminescent structure coupled to the windshield and configured to luminesce in response to excitation by light emitted from at least one of the first light source and the second light source,
   wherein one of the first light source and the second light source are a part of a rearview mirror assembly.

16. The windshield display system of claim 15, wherein the first light source is part of a roof structure of the vehicle.

17. The windshield display system of claim 16, wherein the second light source is part of the rearview mirror assembly, wherein the direction in which light is emitted from the second light source depends on the position of the rearview mirror assembly.

18. The windshield display system of claim 15, wherein the at least one photoluminescent structure luminesces in one of a single color and a plurality of colors.

19. The windshield display system of claim 15, wherein the first light source and the second light source each emit one of an ultraviolet light, a violet light, and a blue light.

* * * * *